Figure 2:
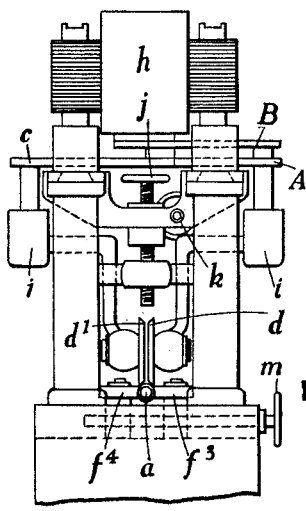

April 18, 1933.   H. F. McLOUGHLIN   1,904,834
PROCESS FOR ELECTRICALLY WELDING METAL TUBING Filed May 10, 1930

INVENTOR
H. F. McLoughlin
BY
ATTORNEYS

Patented Apr. 18, 1933

1,904,834

UNITED STATES PATENT OFFICE

HAROLD FLETCHER McLOUGHLIN, OF SOLIHULL, ENGLAND

PROCESS FOR ELECTRICALLY WELDING METAL TUBING

Application filed May 10, 1930, Serial No. 451,372, and in Great Britain May 27, 1929.

This invention relates to methods of, and apparatus or means for, continuously electrically welding the longitudinal seams of tubing formed from metallic strips, either in a separate tube-forming machine, or in a tube-forming apparatus incorporated in the same structure as the welding apparatus.

The electric welding of metal tubing by the resistance method, as distinct from the arc method, has hitherto been commercially practiced by the application of an electric current to the tube in close proximity to the seam by means of one, two or more roller electrodes connected respectively to the source of electric supply, the heat generated by the passage of the current through the seam, or at the point of contact of the electrode or electrodes with the seam, causing the metal at the edges of the seam to become plastic, and when in this condition, the seam is welded by the action of pressure rolls adapted to press the plastic edges together.

The methods hitherto employed in accomplishing this continuous welding may be divided into two main classes, viz.—the method in which two electrodes are adapted to make contact with the tube on opposite sides of the seam to be welded, and (2) the method in which one or more electrodes are adapted to make contact with the tube along the seam to be welded.

With both these methods, and in order to attain a high speed of welding and consequent economical production, currents of very large amperages at comparatively low applied voltages are employed and from considerations of economy, an alternating current supply is generally adopted.

In method (1) a single phase current is carried to the pair of roller electrodes from the secondary winding of a single phase transformer designed to provide an alternating current of comparatively high amperage at a comparatively low voltage, and as the edge profiles of the rollers are arranged to conform with the sectional periphery of the tube adjacent to and on opposite sides of the seam and to be pressed heavily thereon in order to make good electrical contact, the major portion of the electrical energy used in overcoming the electrical resistance interposed between the electrodes is utilized in overcoming the electrical resistance of the pressure-closed seam. This method is attended by certain disadvantages. For instance, as the standard commercial electric supply in certain countries is a three-phase alternating current of 50 cycles per second, the method involves the converting of the three-phase supply into a single-phase current by means of a rotary converter, which entails the use of expensive additional rotary plant and consequent additional liability to breakdown. Further, as a single-phase current is used in the actual welding of a seam which is progressively passed at a uniform velocity between the electrodes, it follows that the edges of the seam are not uniformly heated, but that successive points are heated to a degree in proportion to the value of the current at the moment the edges pass between the electrodes.

It also follows that as pressure must be applied at the moment to effect the welding, successive points along the seam will not exhibit uniform texture or strength of weld, since those points which are raised to a degree of plasticity above that necessary to effect satisfactory welding will be forced inside and outside the seam and form burrs which, unless subsequently removed, militate against the use of the finished tubing for the purposes where perfectly smooth interior and exterior surfaces are necessary, whilst those points which are not sufficiently raised to a degree of plasticity will not be satisfactorily welded together. Consequently, the periodicity of the single phase supply is a determining factor in the speed at which satisfactory welding may be accomplished.

Further, as satisfactory welding by this method depends upon the almost instantaneous raising of the seam faces between the electrodes to welding temperature, it follows that the strip employed in forming the tube must be extremely accurate and uniform as regards width and gauge and that the tube adjacent to the seam must also be extremely uniform to ensure a constant electrical resistance between the electrodes. This high degree of uniformity and accuracy required is necessarily reflected upon the cost of the strip used.

As regards method (2), either a single phase or multiphase electric supply is carried to the electrode or electrodes from the secondary winding or windings of a single or multiphase transformer designed to provide an alternating current of comparatively high amperage and low voltage. Usually, a series or train of two or more electrodes is employed, and as the edge profiles of the electrodes are arranged to conform as closely as possible with the periphery of the tube adjacent to the seam and to be pressed heavily thereon, the electrical energy employed in overcoming the electrical resistance interposed between the electrodes is utilized in overcoming the electrical resistance of the contact or contacts between the electrodes working on the seam and the electrical resistance of the length of tube lying between the individual electrodes of the train. Although the former resistance may be relatively small compared with the latter resistance, it is found that when the value of the current flowing along the seam is such as to bring the seam to a sufficiently high welding temperature by virtue of the resistance offered by the length of tube lying between the electrodes, then the heat generated by that value of current flowing through the contact resistance between the electrode and seam is so intense as to cause burning of both the tube and electrodes. Therefore, to prevent this and to effect satisfactory welding, it is necessary to limit the value of the current to ensure that only sufficient heat is generated at the point or points of contact between electrode and tube seam for welding of the seam edges to be effected when the latter are pressed together by the seam closing rollers.

The disadvantages attendant upon this method are as follows:—

(a) When a single-phase alternating current is utilized, the same disadvantage applies as in method (1) attendant upon the employment of rotary apparatus for the conversion of three-phase supply to single-phase supply.

(b) When single-phase supply is used in conjunction with a single electrode making contact with the seam of the tube and a complementary contacting device or with two or more electrodes in line making contact with the seam of the tube, or when three-phase supply is used in conjunction with more than two electrodes making contact with the seam of the tube, then it is found that the commercial variation in the width and gauge of the metal strip employed in forming the tube causes the tube at the seam to present a non-uniform surface to the edge profile of the electrode or electrodes, and introduces a variable contact resistance between the electrode or electrodes and the tube in the region of the seam, and as this contact resistance is low in comparison with the resistance of the length of tube in the current path, it follows that at those instances where the contact resistance is higher than normal, and particularly when such instances coincide with a current value which is higher than the R. M. S. value, excessive heat is generated which overheats or burns both tube and electrode. This destroys the accuracy of edge profile of the electrodes and recurrently causes further over-heating or burning with every revolution of the electrode and produces a badly marked or pitted appearance of the seam that militates against the commercial value of the finished product.

(c) As the mean value of the contact resistance between electrode and tube seam is low compared with the electrical resistance of the length of tube between the electrodes, or lying in the current path, it follows that the minor portion of the electrical energy employed is effectively utilized in heating the seam to welding temperature and that in consequence thereof the electrical efficiency of method (2) is less than the electrical efficiency of method (1).

With the objects of obviating or eliminating the above-discussed disadvantages attending the known methods of resistance welding, and providing for the economical and rapid commercial production of perfectly or homogeneously and uniformly welded tubing, the present invention consists in or comprises methods of and means for electrically-welding pressure-closed tube seams that involve the use of a system of electrodes which are so arranged and so connected with an alternating current supply as to provide for a simultaneous longitudinal and transverse flow of current in relation to the seam.

Figure 1:
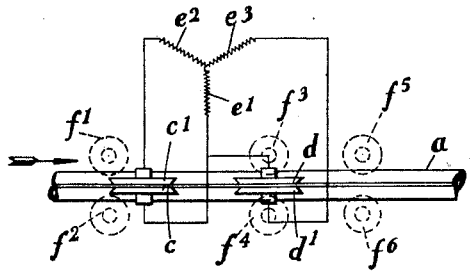

The said method enables the utilization of three-phase alternating current of commercial or standard frequency, and according to one application of the said invention which is shown diagrammatically in Figure 1 of the accompanying drawing, the current is applied to the pressure-closed seam of the tube $a$ (which closing may be effected by a system of pressure rollers $f^1, f^2, f^3, f^4, f^5, f^6$, that are suitably insulated to confine the current path to within the tube) through two pairs of roller electrodes $c\ c^1$ and $d\ d^1$ arranged in tandem, with the roller electrodes of each pair disposed respectively on opposite sides of the seam.

A roller electrode $c$ of the pair $c\ c^1$ under which the tube first passes in its progress through the machine, and a roller electrode $d$, in the opposite side of the seam, of the other pair are electrically interconnected and have a common connection with one phase $e^1$ of the secondary windings of the supply transformer, whilst the other two or non-interconnected roller electrodes $c^1$ $d^1$ are respectively connected with the other two secondary-winding phases $e^2$ $e^3$. Pairs of insulated rollers such as $f^1$ $f^2$ $f^3$ $f^4$ $f^5$ $f^6$ are arranged in appropriate relation to the electrodes for maintaining seam-closing pressure to the tube during its passage between the pairs of electrodes and for maintaining the pressure after the welded tube has passed beyond the electrodes $d$ $d^1$.

With such an arrangement of electrodes and connections as shown in the diagram, the three-phase current is caused simultaneously to traverse the seam and to flow along the seam, or, in other words, the current delivered to any electrode is at all times provided with a double path, viz.—a path across the seam and a path along the tube adjacent and parallel to the length of the seam lying between the two pairs of electrodes, and the value of the current in each path will be in the inverse ratio of the relative resistance offered by the respective paths.

The electrodes are so arranged and individually adjusted that they have a uniform bearing upon and contact with the surfaces of the tube adjacent to, and on opposite sides of, the seam, but not upon the seam itself, and as these surfaces, in commercial rolled tubing are of regular and uniform smoothness, and the contact resistance between electrode and tube is not affected by commercial variations in width and gauge of the metal strip employed in forming the tube, the heat developed by the welding current in overcoming such contact resistance between electrode and tube is also uniform and is not liable to become so intense as to result in over-heating or burning and consequent marking of the tube, or in burning of the electrodes.

Further, the pressure-closed seam, on being brought between the first pair of electrodes $c$ $c^1$ is initially raised in temperature or "pre-heated" by the transverse passage of the alternating current in the current path between the said electrodes $c$ $c^1$, which initial temperature is maintained, or may even be increased, by the heating of the metal during travel of the tube between the electrodes of the first pair $c$ $c^1$ and the electrodes of the second pair $d$ $d^1$ by the current that takes the alternative path along the seam of the tube, whilst the further or final welding heat is applied when the seam comes under the electrodes $d$ $d^1$ where the effect of the current taking the path between the said electrodes $d$ $d^1$ supplements or is imposed on the effect of the current taking the longitudinal path between $c$ $c^1$ and $d$ $d^1$.

In order to regulate the relative value of the currents passing across and along the seam for any particular diameter and thickness of metal tube, provision may be made for adjusting the longitudinal spacing of the two pairs of electrodes to vary the relation between the resistance of the length of tube situate between the two pairs of electrodes and the resistance of the tube measured transversely between the two electrodes of the pairs.

To ensure the edge profiles of each pair of electrodes making intimate contact with the surface of the tube adjacent to the seam, and to compensate for wear upon the edge profiles of the electrodes, each pair of electrodes may be provided with suitable means for vertical adjustment and variability of pressure upon the tube whilst welding is in progress without disturbing the connecting means for conducting the alternating current from the individual phase secondary windings of the transformer to the respective interconnected and non-interconnected electrodes.

The strength of a seam weld when at the critical temperature (i. e. when the molecules of the metal at the seam are rendered mobile by the heat generated or applied) is proportional to or depends upon the seam-closing pressure applied to the seam and to the period of time during which such pressure is applied. In other words, with a given critical temperature of the seam, the strength of weld obtained with a given pressure sustained for a given period of time may also be obtained with a lesser pressure applied to the seam for a greater interval of time, and as the extent of the "burr" or "upset" produced is dependent upon the pressure applied, it follows that a reduction in resulting "upset" may be obtained without diminishing the strength of the weld by applying a lesser pressure to the seam for a longer interval of time.

The invention enables every portion of the seam lying between the first and second pairs of electrodes to be maintained at or above the critical temperature throughout the period of passage from one pair of the electrodes to the other, and as this period of time is relatively long compared with the almost instantaneous period during which pressure must be applied to the seam cleft in the case of the known method (1) previously referred to, it follows that in the welding of tubing according to the present invention relatively low pressure may be applied to the seam without detriment to the strength of the final weld but with substantial elimination of objectionable internal and external upsets or burrs. It also follows that during the passage of the tube beyond the first pair of roller electrodes where the metal adjacent to the seam is rendered plastic, any irregularities in the thickness or width of strip may be corrected by the action of the side pressure rolls and a uniform seam zone presented to the second pair of electrodes where welding is finally completed. Thus, by the method involved in the present invention, greater variations in the gauge and width of strip utilized in the formation of the tube are permissible than where the known method (1) is employed, with consequent reflection in the cost of the strip.

Figure 3:
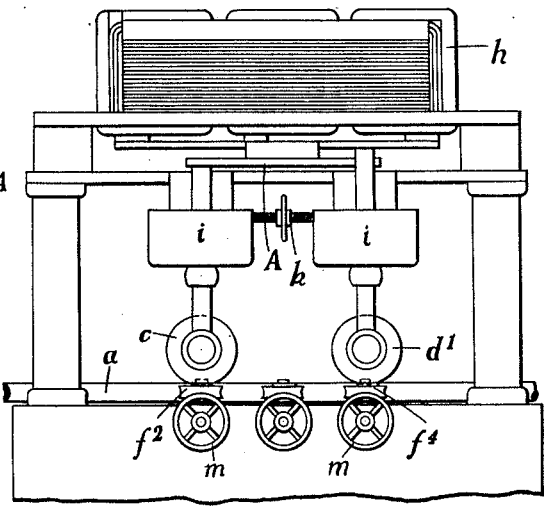
Figure 4:
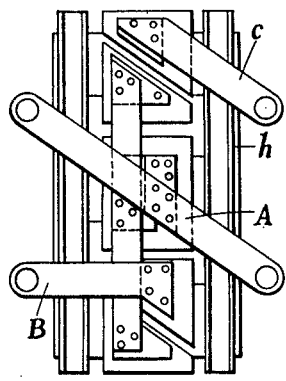

Figures 2, 3, and 4, of the accompanying drawing show an apparatus or machine adapted for working or conducting the method of welding above described with reference to the diagram Figure 1; Figure 2 being an end elevation and Figure 3 a side elevation of the said machine, whilst Figure 4 shows an arrangement of the connections between the secondary windings of the three-phase transformer and the system of electrodes.

In this machine, the electrodes and pressure rollers are arranged substantially in the same manner as in the diagram Figure 1, and are marked with the same letters of reference, whilst the transformer $h$ is mounted above the electrodes and the connection between the secondary windings and the electrodes is made by three conductors A, B, and C (whose arrangement is best shown in Figure 4) which are respectively connected with different-phases of secondary windings of the transformer. The conductor A connected with the phase indicated by $e^1$ in Figure 1 serves the two interconnected electrodes $c$ and $d$, whilst the conductor B connected with the second phase $e^2$ serves the electrode $c^1$ and the conductor C connected with the third phase $e^3$ serves the electrode $d^1$.

Mercury-cups or similar expedients are arranged at $i$ between the conductors A, B, C, and suspension brackets of the complementary electrodes, and a hand-screw and nut adjustment ($j$) is provided in connection with each pair of suspended electrodes for raising and lowering the electrode-hangers in relation to the tube path and thus enables the regulation of the pressure contact between the said electrode and the tube surfaces on opposite sides of the seam. Another hand-screw and nut adjustment ($k$) is provided for changing the lateral relationship of the two pairs of electrodes and enabling regulation of the distance between the pairs of contact points and consequently the length of the longitudinal current-path.

The insulated rollers for applying seam-closing pressure are arranged as shown in Figures 2 and 3 in pairs with the rollers of each pair on opposite sides of the tube track, and each pair of rollers is associated with its own hand-screw and nut adjustment $m$ for enabling regulation of the seam-closing pressure. Preferably, and as shown, a pair of rolls is arranged to apply seam-closing pressure to the tube immediately below the points of contact of each pair of electrodes. The machine shown in the drawing Figures 2, 3, and 4, does not embody closing rolls corresponding to those marked $f^5$ $f^6$ in the diagram Figure 1, but such rolls may be embodied in the machine in any convenient manner for maintaining pressure on the tube after the welded seam has passed the electrodes $d$ $d^1$.

Whilst it is preferable to work the invention by using a three-phase current of a standard or commercial frequency it may also be operated from any alternating current supply where the transformer can be adapted to deliver current to any interconnected electrodes and to independently-supplied electrodes for enabling the heating of the tube seam by the simultaneous flow of current through paths transversely to and parallel with the said seam, and where the nature of the alternating current permits of or necessitates it, more than two tandem pairs of electrodes may be used and so connected with the supply as to provide for the said transverse and parallel flow of the welding current.

Having described my invention what I claim and desire to secure by Letters Patent is:—

1. An electrical resistance method of continuously welding the seam of a metal tube which comprises progressively moving the tube axially relative to separated points along the tube, applying potential at such points across the seam and simultaneously applying potential between said points.

2. An electrical resistance method of continuously welding the seam of a metal tube which comprises applying pressure to the tube so as to close together the edges of the seam, progressively moving the tube axially while subject to such pressure relative to separated points along the tube, applying potential at such points across the seam and simultaneously applying potential between said points.

3. An electrical resistance method of continuously welding the seam of a metal tube which comprises progressively moving the tube axially relative to two pairs of electrodes spaced apart along the surface of the tube, one electrode of each pair contacting with the material of the tube adjacent to one edge of the seam and the other electrode of the pair contacting with the material of the tube adjacent to the opposite edge of the seam, applying potential across the seam between the electrodes of each pair and simultaneously applying potential along the seam between an electrode of one pair and an electrode of the other pair.

4. An electrical resistance method of continuously welding the seam of a metal tube which comprises applying pressure to the tube so as to close together the edges of the seam, progressively moving the tube axially while subject to such pressure relative to two pairs of electrodes spaced apart along the surface of the tube, one electrode of each pair contacting with the material of the tube adjacent to one edge of the seam and the other electrode of the pair contacting with the material of the tube adjacent to the opposite edge of the seam, applying potential across the seam between the electrodes of each pair and simultaneously applying potential along the seam between the electrode of one pair and an electrode of the other pair.

5. An electrical resistance method of continuously welding the seam of a metal tube which comprises applying pressure to the tube so as to close together the edges of the seam, progressively moving the tube axially while subject to such pressure relative to two pairs of electrodes spaced apart along the surface of the tube, one electrode of each pair contacting with the material of the tube adjacent to one edge of the seam and the other electrode of the pair contacting with the material of the tube adjacent to the opposite edge of the seam, applying potential across the seam between the electrodes of each pair, simultaneously applying potential along the seam between the electrode of one pair and the electrode of the other pair, and thereafter continuing the application of the pressure to the tube until the temperature of the seam has fallen below the critical temperature.

In witness whereof I hereunto affix my signature.

H. F. McLOUGHLIN.